United States Patent
Wang

(10) Patent No.: US 9,228,818 B2
(45) Date of Patent: Jan. 5, 2016

(54) TOOL FOR DETECTING VERTICALITY BETWEEN AXLE HOLE AND MILLING PLANE

(75) Inventor: Xin Wang, Zhejiang (CN)

(73) Assignee: ZHEJIANG LINIX MOTOR CO., LTD., Hengdian Electronic Industry Zone, Dongyang, Zhejiang (CN)

( * ) Notice: Subject to any disclaimer, the term of this patent is extended or adjusted under 35 U.S.C. 154(b) by 259 days.

(21) Appl. No.: 13/880,363

(22) PCT Filed: May 18, 2012

(86) PCT No.: PCT/CN2012/075688
§ 371 (c)(1),
(2), (4) Date: Apr. 18, 2013

(87) PCT Pub. No.: WO2013/120326
PCT Pub. Date: Aug. 22, 2013

(65) Prior Publication Data
US 2013/0318806 A1 Dec. 5, 2013

(51) Int. Cl.
*G01B 21/22* (2006.01)
*G01B 5/25* (2006.01)
*G01B 5/245* (2006.01)
G01B 5/28 (2006.01)
G01B 5/24 (2006.01)
G01B 7/34 (2006.01)
G01B 3/56 (2006.01)

(52) U.S. Cl.
CPC .................. *G01B 5/25* (2013.01); *G01B 5/245* (2013.01); *G01B 3/56* (2013.01); *G01B 5/24* (2013.01); *G01B 5/285* (2013.01); *G01B 7/345* (2013.01)

(58) Field of Classification Search
CPC .......... G01B 5/285; G01B 7/345; G01B 5/25; G01B 5/24; G01B 3/56; G01B 5/245
USPC ..................................................... 33/533, 535
See application file for complete search history.

(56) References Cited

U.S. PATENT DOCUMENTS

| 3,045,352 A * | 7/1962 | Kimerer ........................... 33/474 |
| 3,755,905 A * | 9/1973 | Blubaugh et al. ................ 33/286 |
| 4,020,742 A * | 5/1977 | Raymond ..................... 409/218 |
| 4,669,227 A * | 6/1987 | Treppner ...................... 451/370 |
| 2011/0214306 A1 * | 9/2011 | Zhang .............................. 33/712 |

* cited by examiner

*Primary Examiner* — Laura Martin
*Assistant Examiner* — Rhyan C Lange
(74) *Attorney, Agent, or Firm* — Global IP Services; Tianhua Gu

(57) ABSTRACT

The tool for detecting the verticality between an axle hole and a milling plane comprises a base provided with a horizontal plane and a vertical plane which are vertically intersected, a vertical through hole is provided, a locating plate is vertically arranged and located in the middle of the vertical through hole, the locating plate is fixed with the vertical plane, a horizontal through hole is provided on the locating plate, two vertical pin rods are arranged at a position of the base away from the vertical through hole, the vertical pin rods are symmetric with respect to the axis of the horizontal through hole, a detection rod can be inserted into the horizontal through hole.

9 Claims, 2 Drawing Sheets

TOOL FOR DETECTING VERTICALITY BETWEEN AXLE HOLE AND MILLING PLANE

TECHNICAL FIELD

The invention relates to a tool for detecting the verticality between an axle hole and a milling plane, belonging to the technical field of tool equipment.

BACKGROUND OF THE INVENTION

During processing and assembling of a workpiece, it is usually required to measure the verticality between two structures of the workpiece, to determine whether the workpiece meets the processing, assembling, and other requirements. The existing verticality measurement tools mainly comprise square, three-coordinate measuring machine, plumb bob, laser measuring instrument, etc. These instruments are usually simple in structure, and can be used for the measurement between a straight line and a plane, and a plane and a plane. However, many workpieces are complicated in structure, the conventional verticality detection devices may be difficult to be placed properly in the workpieces for measurement, or the measurement process is too complicated, or the measuring tools are too expensive, so that the conventional simple verticality detection devices cannot be well applied to the assembly process of the workpieces. Although some verticality measuring devices may measure the verticality of the workpieces, the results of measurement cannot be displayed intuitively.

SUMMARY OF THE INVENTION

The invention aims to provide a tool for detecting the verticality between an axle hole and a milling plane, which solves the problems in the prior art that the verticality detection devices cannot be placed properly in the workpieces for measurement, the verticality measurement process is too complicated, and the verticality measurement results are not intuitive.

In the invention, the following technical solution is employed to solve the technical problems mentioned above.

The tool for detecting the verticality between an axle hole and a milling plane comprises a base, the base is provided with a horizontal plane and a vertical plane which are vertically intersected, a vertical through hole is provided at the intersection between the horizontal plane and the vertical plane, a locating plate is vertically arranged and located in the middle of the vertical through hole, the locating plate is fixed with the vertical plane, a horizontal through hole is provided on the locating plate, an axis of the horizontal through hole is vertically intersected with an axis of the vertical through hole, two vertical pin rods are arranged at a position of the base away from the vertical through hole, the vertical pin rods are symmetric with respect to the axis of the horizontal through hole, a detection rod like a long rod has an insertion end that can be inserted into the horizontal through hole, the length of the detection rod is larger than the distance from the axis of the vertical through hole to the midpoint of the two vertical pin rods, and the other end of the detection rod is fixed with a detection rod handle.

The tool for detecting the verticality between an axle hole and a milling plane mainly detects the workpiece having a structure in which a milling plane is communicated with an axle hole. During the detection process, the workpiece to be detected is firstly inserted into the vertical through hole on the base, the milling plane is ensured to be clung closely to the locating plate, and the axle hole is ensured to be aligned with the horizontal through hole on the locating plate. Then, the insertion end of the detection rod is inserted into the horizontal through hole on the locating plate via the axle hole. The position relationship between the detection rod and the vertical pin rods is observed from the other end of the detection rod. If the detection rod passes through the midpoint of the vertical pin rods, it indicates that the verticality between the axle hole and the milling plane is high. If the detection rod inclines to the vertical pin rods, it indicates that the axle hole is not vertical to the milling plane. It can be intuitively judged whether the verticality between the axle hole and the milling plane meets the processing, assembling and other requirements according to the degree that the detection rod inclines to the vertical pin rods.

In the invention, as a detection rod with a length much larger than that of the axle hole is adopted, the position change of the edge caused by tiny angle change between the axle hole and the milling plane is amplified, and the verticality of the workpiece is detected intuitively and quickly according to the position with the axis of the vertical through hole.

Preferably, the base is provided with a horizontal threaded through hole, the horizontal threaded through hole is coaxial with the horizontal through hole, a fixing rod fits with the threads of the horizontal threaded through hole, and the fixing rod is provided with a fixing rod knob.

When used, after the tool is placed into the workpiece to be detected, the fixing rod is twisted, so that the end of the fixing rod close to the vertical through hole presses the workpiece to be detected tightly to fix the workpiece. After the detection of the workpiece is finished, the fixing rod is loosened, and the workpiece may be taken out. The fixing rod can be easily loosened as the fixing rod is provided with the fixing rod knob. The function of the fixing rod is to stably fix the workpiece to be detected on the tool for detecting the verticality between an axle hole and a milling plane, to prevent slight shake and displacement generated during the operation from affecting the detection result.

Preferably, the end of the fixing rod close to the vertical through hole is of a smooth spherical structure. The smooth spherical structure may protect the workpiece to be detected from damage and wear.

Preferably, the locating plate is in a structure of flat cuboid. The locating plate and the vertical plane are fixed by two bolts. The structure of flat cuboid may supply a plane at the bottom of the locating plate to contact the horizontal plane, so that the locating plate may be placed more stably.

Preferably, the length of the detection rod is larger than the distance from the axis of the vertical through hole to the edge of the base provided with the vertical pin rods. During actual measurement process, a locating rod beyond the edge of the base may make it easy for a user to pull out or insert in the detection rod.

Preferably, the insertion end of the detection rod is of a truncated cone-shaped structure with a taper of 1:250-1:400. The truncated cone-shaped structure brings a taper at the front end of the detection rod, and the tapered detection rod can be easily inserted into the horizontal through hole of the locating plate.

Preferably, the detection rod is made of hard alloys. During the detection of the verticality between an axle hole and a milling plane, the workpieces to be detected, which are made of metals, easily cause wear on the detection tool during the detection process. Meanwhile, during the detection process, whether the detection rod is perfectly straight is very important to the detection results. The detection rod is made of hard alloys, so that during the long-term use, the wear resistance of the detection rod is improved, and the service life thereof is prolonged. As deformation of hard alloys is unlikely to happen, the accuracy of the detection results is guaranteed.

Preferably, the length of the detection rod handle is symmetric with respect to the axis of the detection rod. The symmetric detection rod handle makes the movement of the detection rod stable.

Therefore, the invention has the advantages that, the verticality relationship between an axle hole and a milling plane can be conveniently and intuitively observed, the workpiece to be detected can be fixed quickly and stably, and the tool is wear-resistant, and so on.

DETAILED DESCRIPTION OF THE INVENTION

The technical solution of the invention will be further described in details as below with reference to embodiments and drawings.

Embodiment 1

Figure 1:
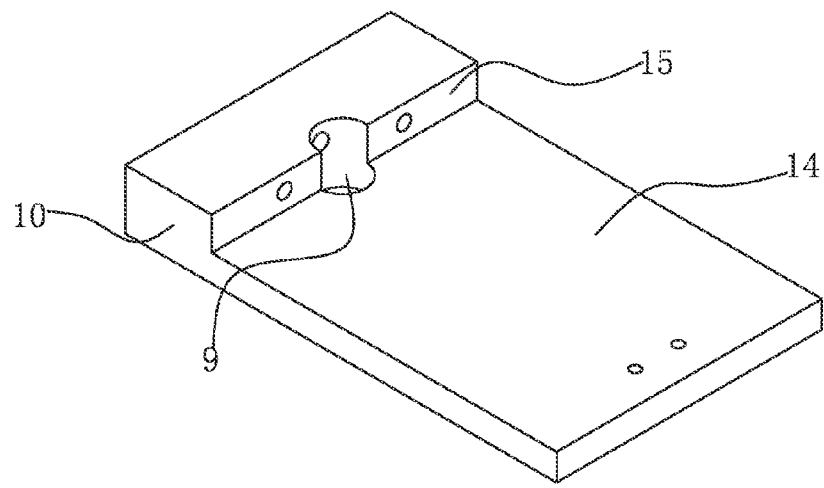
FIG. 1 is a structural diagram of a base of the invention.

FIG. 1 is a structural diagram of a base of a tool for detecting the verticality between an axle hole and a milling plane, abase 10 is provided with a horizontal plane 14 and a vertical plane 15 which are vertically intersected, and a vertical through hole 9 is arranged at the intersection between the horizontal plane 14 and the vertical plane 15.

Figure 2:
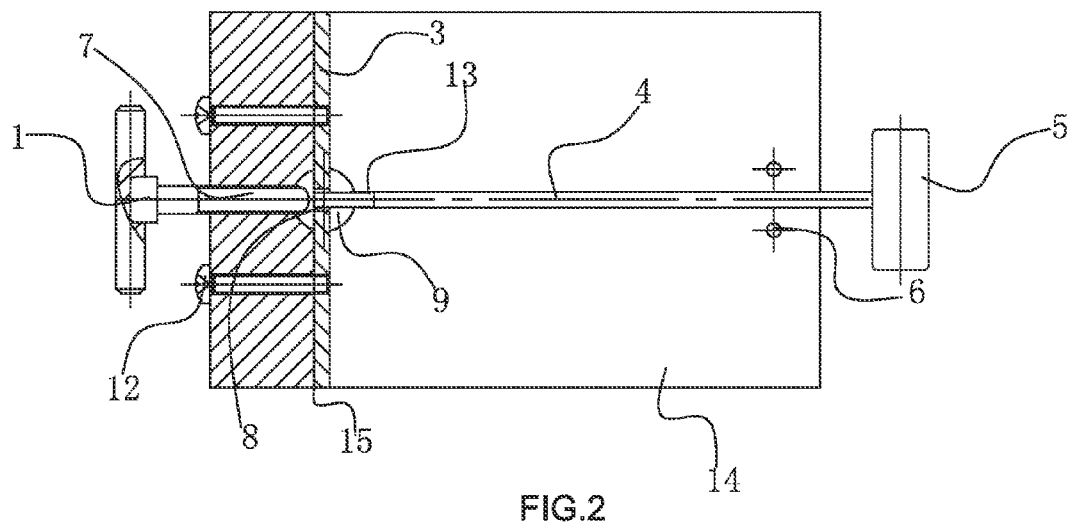
FIG. 2 is a top view of a structural diagram of the invention.

In the tool for detecting the verticality between an axle hole and a milling plane as shown in FIG. 2, a locating plate 3, in a structure of flat cuboid, is vertically arranged and located in the middle of the vertical through hole 9, the locating plate 3 and the vertical plane 15 are fixed through bolts 12 which are bilaterally symmetric, and a horizontal through hole 8 is provided on the locating plate 3, and an axis of the horizontal through hole 8 is vertically intersected with an axis of the vertical through hole 9. Two vertical pin rods 6 are arranged at a position of the base away from the vertical through hole 9, and the vertical pin rods 6 are symmetric with respect to the axis of the horizontal through hole 8. A detection rod 4, which is long rod-shaped and is made of hard alloys, has an insertion end 13 that can be inserted into the horizontal through hole 8, and the insertion end 13 is of a truncated cone-shaped structure with a taper of 1:250-1:400. The length of the detection rod 4 is larger than the distance from the axis of the vertical through hole 9 to the edge of the base 10 provided with the vertical pin rods 6, and the other end of the detection rod 4 is fixed with a detection rod handle 5 which is vertically symmetric to the detection rod 4. The base 10 is provided with a horizontal threaded through hole 2, the horizontal threaded through hole 2 is coaxial with the horizontal through hole 8, a fixing rod 7 fits with the threads of the horizontal threaded through hole 2, the fixing rod 7 is provided with a fixing rod knob 1, and the end of the fixing rod 7 close to the vertical through hole 9 is of a smooth spherical structure.

Figure 3:
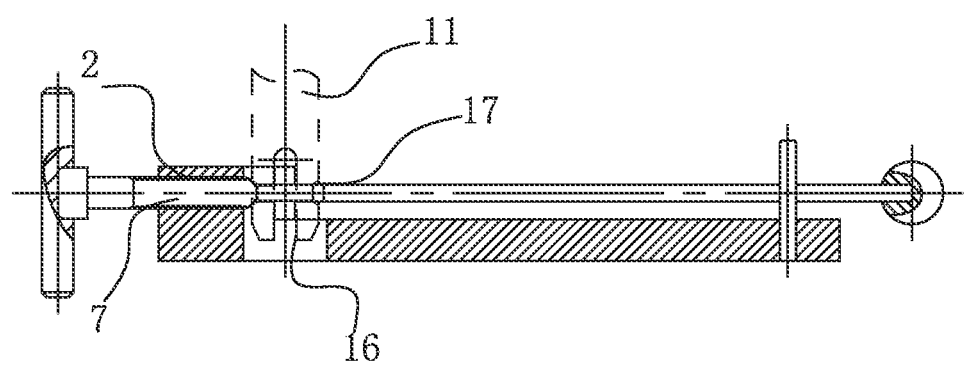
FIG. 3 is a front view of the structural diagram of the invention.

FIG. 3 is a front view of the tool for detecting the verticality between an axle hole and a milling plane of FIG. 2, and a workpiece 11 to be detected is inserted into the vertical through hole 9.

During the detection process, first, the workpiece 11 to be detected is inserted into the vertical through hole 9 on the base 10, the milling plane 16 is ensured to be clung closely to locating plate 3, and the axle hole 17 is ensured to be aligned with the horizontal through hole 8 on the locating plate 3. Then, the detection rod 4 is inserted into the horizontal through hole 8 on the locating plate 3 via the axle hole 17. The position relationship between the detection rod 4 and the vertical pin rods 6 is observed from the other end of the detection rod 4. If the detection rod 4 passes through the midpoint of the vertical pin rods 6, it indicates that the verticality between the axle hole and the milling plane 16 of the workpiece 11 to be detected is high. If the detection rod 4 inclines to the vertical pin rods, it indicates that the axle hole 17 is not vertical to the milling plane 16. It can be intuitively judged whether the verticality between the axle hole 17 and the milling plane 16 meets the processing, assembling and other requirements according to the degree that the detection rod 4 inclines to the vertical pin rods 6.

What is claimed is:

1. A tool for detecting verticality between an axle hole and a milling plane, comprising:
    a base (10), wherein the base (10) is provided with a horizontal plane (14) and a vertical plane (15) which are vertically intersected, a vertical through hole (9) is provided at the intersection between the horizontal plane (14) and the vertical plane (15);
    a locating plate (3) being vertically arranged and located in a middle of the vertical through hole (9), the locating plate (3) is fixed with the vertical plane (15), a horizontal through hole (8) is provided on the locating plate (3), an axis of the horizontal through hole (8) is vertically intersected with an axis of the vertical through hole (9);
    two vertical pin rods (6) being arranged at a position of the base (10) away from the vertical through hole (9), the vertical pin rods (6) are symmetric with respect to the axis of the horizontal through hole (8);
    a detection rod (4) as a long rod having an insertion end (13) that is able to be inserted into the horizontal through hole (8), a length of the detection rod (4) is larger than the distance from the axis of the vertical through hole (9) to the midpoint of the two vertical pin rods (6), and other end of the detection rod (4) is fixed with a detection rod handle (5).

2. The tool for detecting verticality between an axle hole and a milling plane according to claim 1, wherein the base (10) is provided with a horizontal threaded through hole (2), the horizontal threaded through hole (2) is coaxial with the horizontal through hole (8), a fixing rod (7) fits with a thread of the horizontal threaded through hole (2), and the fixing rod (7) is provided with a fixing rod knob (1).

3. The tool for detecting verticality between an axle hole and a milling plane according to claim 2, wherein an end of the fixing rod (7) near the vertical through hole (9) is of a smooth spherical structure.

4. The tool for detecting verticality between an axle hole and a milling plane according to claim 1, wherein the locating plate (3) and the vertical plane (15) are fixed through bolts (12) which are bilaterally symmetric.

5. The tool for detecting verticality between an axle hole and a milling plane according to claim 1, wherein the locating plate (2) is in a structure of flat cuboid.

6. The tool for detecting verticality between an axle hole and a milling plane according to claim 1, wherein the length of the detection rod (4) is larger than a distance from the axis of the vertical through hole (9) to the edge of the base (10) where the vertical pin rods (6) are located.

7. The tool for detecting verticality between an axle hole and a milling plane according to claim 1, wherein the insertion end (13) of the detection rod (4) is of a truncated cone-shaped structure with a taper of 1:250-1:400.

8. The tool for detecting verticality between an axle hole and a milling plane according to claim 1, wherein the detection rod (4) is of hard alloys.

9. The tool for detecting verticality between an axle hole and a milling plane according to claim 1, wherein a length of the detection rod handle (5) is symmetric with respect to the axis of the detection rod (4).

* * * * *